United States Patent
Katsumata et al.

(10) Patent No.: US 12,372,460 B2
(45) Date of Patent: Jul. 29, 2025

(54) FOURIER TRANSFORM INFRARED SPECTROMETER

(71) Applicant: JASCO CORPORATION, Tokyo (JP)

(72) Inventors: Tomohiro Katsumata, Tokyo (JP); Hiroshi Sugiyama, Tokyo (JP)

(73) Assignee: JASCO CORPORATION, Tokyo (JP)

( * ) Notice: Subject to any disclaimer, the term of this patent is extended or adjusted under 35 U.S.C. 154(b) by 278 days.

(21) Appl. No.: 18/112,127

(22) Filed: Feb. 21, 2023

(65) Prior Publication Data

US 2023/0266242 A1   Aug. 24, 2023

(30) Foreign Application Priority Data

Feb. 22, 2022  (JP) .................................. 2022-025570

(51) Int. Cl.
  *G01N 21/3563*  (2014.01)
  *G01N 21/35*    (2014.01)

(52) U.S. Cl.
  CPC .  *G01N 21/3563* (2013.01); *G01N 2021/3595* (2013.01); *G01N 2201/06113* (2013.01);
  (Continued)

(58) Field of Classification Search
  CPC ....... G01N 21/3563; G01N 2021/3595; G01N 2201/06113; G01N 2201/0636;
  (Continued)

(56) References Cited

U.S. PATENT DOCUMENTS 5,604,581 A  *  2/1997  Liu ..................... G01B 11/0625
                                                          356/73
5,790,250 A  *  8/1998  Wang ..................... G01J 3/453
                                                         356/451
(Continued)

FOREIGN PATENT DOCUMENTS

CN    106841086 A  *  6/2017  ................ G01J 3/45
CN    110376153 A  * 10/2019  ......... G01N 21/3563
(Continued)

OTHER PUBLICATIONS

Extended European Search Report Issued in Corresponding EP Patent Application No. 23157628.1, dated Jul. 5, 2023.
(Continued)

*Primary Examiner* — Edwin C Gunberg
*Assistant Examiner* — Richard O Toohey
(74) *Attorney, Agent, or Firm* — Greenblum & Bernstein, P.L.C.

(57) ABSTRACT

A Fourier transform infrared spectrometer (FTIR) includes: an infrared light source; an interferometer; a semiconductor laser for position reference of a movable mirror thereof, and a computer that performs Fourier transformation to a detected signal of an infrared interference wave from a sample to calculate a spectrum based on a memorized wavelength of the semiconductor laser and a detected value of a laser interference wave by a laser detector. The computer executes a program for calculating a spectrum of a solid reference sample, interpolating the spectrum of the reference sample in a wavenumber region of a unique peak, reading out a wavenumber of the unique peak based on a data after interpolation, and updating the wavelength of the semiconductor laser used in Fourier transformation such that the read-out value of the wavenumber falls within a specific range having an original wavenumber of the unique peak as a reference.

14 Claims, 4 Drawing Sheets

(52) U.S. Cl.
CPC ............... *G01N 2201/0636* (2013.01); *G01N 2201/1211* (2013.01)

(58) Field of Classification Search
CPC ......... G01N 2201/1211; G01N 21/3504; G01J 2003/2859; G01J 2003/2866; G01J 3/0297; G01J 3/45
See application file for complete search history.

(56) References Cited

U.S. PATENT DOCUMENTS

| | | | |
|---|---|---|---|
| 11,009,454 B2 | 5/2021 | Wakuda | |
| 2002/0097402 A1* | 7/2002 | Manning | G01J 3/453 356/454 |
| 2005/0073690 A1* | 4/2005 | Abbink | G01J 3/45 356/451 |
| 2006/0044554 A1* | 3/2006 | Mertz | G01N 21/0332 356/246 |
| 2020/0217786 A1* | 7/2020 | Wakuda | G01N 21/274 |

FOREIGN PATENT DOCUMENTS

| | | | |
|---|---|---|---|
| JP | 2020-112364 | 7/2020 | |
| WO | WO-2014194935 A1 * | 12/2014 | ............ G01J 3/0291 |

OTHER PUBLICATIONS

Simmonds, Jo Ann et al., Internal Diagnostics for FT-IR Spectrometry, SPIE vol. 3082, (1997) p. 106-120.

* cited by examiner

FOURIER TRANSFORM INFRARED SPECTROMETER

RELATED APPLICATION

This application claims the priority of Japanese Patent Application No. 2022-25570 filed on Feb. 22, 2022, the disclosure of which is incorporated herein by reference in its entirety.

TECHNICAL FIELD

The present invention relates to a Fourier transform infrared spectrometer (FTIR) having a wavenumber correction function.

BACKGROUND ART

A Fourier transform infrared spectrometer uses an interferometer to detect an interference wave of a measurement light non-dispersively, and performs Fourier transformation with a computer to acquire a spectral data of the measurement light. By forming the interference wave, each wavenumber component can be calculated by Fourier transformation from an intensity signal composed of a total wavenumber component thereof. Fourier transform spectroscopy is suitable for a high-speed measurement, and it is the mainstream in infrared spectrophotometers.

The interferometer used in this apparatus is generally a Michelson interferometer, and comprises a translucent mirror (e.g., a beam splitter) and two reflection mirrors (a fixed mirror and a movable mirror). The movable mirror makes an optical path difference of the interferometer to be changeable, and the position of the movable mirror and the optical path difference are in a one-on-one relationship. The interferometer generates the interference wave of the measurement light in accordance with the optical path difference. By detecting an intensity of this interference wave, an interferogram (interference curve) having the optical path difference on a horizontal axis and an intensity signal on a vertical axis can be acquired. A computer performs Fourier transformation to the interferogram data to calculate a spectral data.

Having a position at which the optical path difference is zero as a reference, the interference wave is generally detected at a timing when a distance travelled by that the movable mirror becomes the position of each wavelength of a position reference laser. When a laser light is irradiated to the movable mirror, a laser interference wave is formed from a reflected light thereof. The interference wave of the measurement light is usually detected at a timing when an intensity signal of the laser interference wave becomes zero. That is, the detection timing depends on a wavelength A of the position reference laser.

CITATION LIST

Patent Literature

Patent Literature 1: Japanese Unexamined Patent Publication No. 2020-112364 A

SUMMARY OF INVENTION

Technical Problem

As described above, since the detection timing of the interference wave of the infrared light depends on the wavelength 2 of the position reference laser, a He—Ne laser, which is a gas laser having a stable wavelength 2, was generally used as a rangefinder; however, a compact and inexpensive semiconductor laser is used recently. Unlike gas lasers, the wavelength A of the semiconductor laser is not stable, so that wavenumber correction is necessary for improving reliability of the wavenumber.

For example, Patent Literature 1 shows a FTIR using a semiconductor laser as the position reference laser, and describes a method of correcting a wavelength of the semiconductor laser. That is, as a first step, an absorption peak of carbon dioxide in the atmosphere inside the interferometer is measured based on a wavelength before correction, and a wavenumber thereof and a wavenumber of the original absorption peak of carbon dioxide are compared to correct the wavelength of the semiconductor laser. As a second step, an absorption peak of water vapor in the atmosphere is measured based on the wavelength after correction, and a wavenumber thereof and a wavenumber of the original absorption peak of water vapor are compared to correct the wavelength of the semiconductor laser again. As described in Patent Literature 1, in order to correct the wavelength of the semiconductor laser, the absorption peak of carbon dioxide is used first, and the absorption peak of water vapor is used subsequently to correct the wavelength in steps.

In Patent Literature 1, since gas (atmosphere) such as carbon dioxide or water vapor is used as a sample (also referred to as a reference sample) for wavenumber correction of the FTIR, it seems that it is advantageous in the point that an absorption peak that is closer to a linear state than a solid reference sample can be set as the target. However, the state inside a sample chamber or a housing of the FTIR is often made into a nitrogen purged state or a vacuum state, and the detection intensity of the absorption peak of carbon dioxide or water vapor in the atmosphere becomes weak (or vanishes). As a result, it may become impossible to correct the wavelength of the semiconductor laser. Nevertheless, once the sample chamber or the housing is nitrogen-purged or vacuumed, it takes a great effort to release the sample chamber or the housing to the atmosphere only for wavenumber correction. Moreover, it is disadvantageous to take the atmosphere, which is an obstructive factor for the measurement, into the apparatus for wavenumber correction. For example, it is more disadvantageous in applications where the FTIR is continuously operated for 24 hours a day, 365 days a year.

Moreover, a peak height of the absorption spectrum of carbon dioxide or water vapor in the atmosphere varies depending on a measurement environment, and is unstable. S/N ratio varies each time the peak height varies (in other words, a measurement time cannot be determined), so that it is difficult to secure precision of wavenumber correction.

Whereas, a method of encapsulating a standard sample such as gas other than carbon dioxide or water vapor, e.g., hydrochloric acid gas, at a predetermined concentration to uniquely define the peak height from a cell length and the concentration may be considered. However, the standard sample such as hydrochloric acid gas may not be suitable as a reference sample for correction since it is difficult to keep the sample for a long term (variation of concentration), and it is not easy to handle (because it is difficult to dispose a cell on an optical path due to the weight and size of the cell, and there are problems of: maintaining an airtight state of the cell since the pressure outside the cell becomes negative when the cell is placed under a vacuum state; and establishing safety measures for gas leak depending on the sample).

As described, the gas samples are not preferred as the reference sample for correction of wavelength. Thus, the inventors used a reference sample, a solid which can be handled easily such as a polystyrene film (e.g., thickness: 0.04 mm), to diligently study on development of a Fourier transform infrared spectrometer that can smoothly and precisely execute wavenumber correction of a measurement spectrum.

The object of the present invention is to provide a Fourier transform infrared spectrometer that can smoothly and precisely execute wavenumber correction of a measurement spectrum using a solid reference sample, particularly in a Fourier transform infrared spectrometer using a semiconductor laser for position reference of a movable mirror.

Solution to Problem

That is, a Fourier transform infrared spectrometer according to the present invention comprises:
   an infrared light source;
   an interferometer that has a beam splitter, a fixed mirror and a movable mirror, and generates an infrared interference wave by using an infrared light from the infrared light source;
   an infrared detector that detects an intensity of the infrared interference wave that transmitted or reflected off a sample;
   a semiconductor laser that irradiates a laser light to the interferometer;
   a laser detector that detects an intensity of a laser interference wave that is generated at the interferometer based on the laser light;
   a memory that memorizes a wavelength of the semiconductor laser; and
   a computer that uses the wavelength in the memory and a detected signal of the laser detector and performs Fourier transformation to a detected signal of the infrared detector to calculate a spectrum of the sample;
wherein
   the computer executes a program for calculating a spectrum of a solid reference sample, interpolating the calculated spectrum of the reference sample in a wavenumber range of at least one unique peak of the reference sample, reading out a wavenumber of the at least one unique peak based on a data after interpolation, and updating the wavelength in the memory such that the read-out value of the wavenumber falls within a specific range having an original wavenumber of the unique peak as a reference.

Moreover, a Fourier transform infrared spectrometer comprises:
   an infrared light source;
   an interferometer that has a beam splitter, a fixed mirror and a movable mirror, and generates an infrared interference wave by using an infrared light from the infrared light source;
   an infrared detector that detects an intensity of the infrared interference wave that transmitted or reflected off a sample;
   a semiconductor laser that irradiates a laser light to the interferometer;
   a laser detector that detects an intensity of a laser interference wave that is generated at the interferometer based on the laser light;
   a memory that memorizes a wavelength of the semiconductor laser;
   a computer that uses the wavelength in the memory and a detected signal of the laser detector and performs Fourier transformation to a detected signal of the infrared detector to calculate a spectrum of the sample;
   a Peltier element that controls temperature of the semiconductor laser; and
   a temperature controller of the Peltier element;
wherein
   the computer executes a program for calculating a spectrum of a solid reference sample, interpolating the calculated spectrum of the reference sample in a wavenumber range of at least one unique peak of the reference sample, reading out a wavenumber of the at least one unique peak based on a data after interpolation, and controlling a temperature of the semiconductor laser by operating the temperature controller of the Peltier element such that the read-out value of the wavenumber falls within a specific range having an original wavenumber of the unique peak as a reference.

Furthermore, a Fourier transform infrared spectrometer comprises:
   an infrared light source;
   an interferometer that has a beam splitter, a fixed mirror and a movable mirror, and generates an infrared interference wave by using an infrared light from the infrared light source;
   an infrared detector that detects an intensity of the infrared interference wave that transmitted or reflected off a sample;
   a semiconductor laser that irradiates a laser light to the interferometer;
   a laser detector that detects an intensity of a laser interference wave that is generated at the interferometer based on the laser light;
   a memory that memorizes a wavelength of the semiconductor laser;
   a computer that uses the wavelength in the memory and a detected signal of the laser detector, and performs Fourier transformation to a detected signal of the infrared detector to calculate a spectrum of the sample; and
   an applied-current controller that controls an applied current to the semiconductor laser,
wherein
   the computer executes a program for calculating a spectrum of a solid reference sample, interpolating the calculated spectrum of the reference sample in a wavenumber range of at least one unique peak of the reference sample, reading out a wavenumber of the at least one unique peak based on a data after interpolation, and controlling the applied current to the semiconductor laser by operating the applied-current controller such that the read-out value of the wavenumber falls within a specific range having an original wavenumber of the unique peak as a reference.

Here, in each invention, the unique peak may be one peak or multiple peaks. For example, when multiple peaks are referred, each difference (each difference of wavenumber) between the read-out values of each peak wavenumber and the original wavenumber (reference wavenumber) are calculated, and, based on these differences of wavenumber, the following processing may be performed: (1) update the wavelength in the memory; (2) control the temperature of the semiconductor laser by the Peltier element; or (3) control the applied current to the semiconductor laser.

Moreover, a well-known cubic spline interpolation or Lagrange interpolation can be adopted as the interpolation.

Moreover, a zero-filling method (a technique capable of simply acquiring spectral data having dense wavenumber intervals after Fourier transformation by imparting zero data to an outer range departed from a center burst of the interferogram data) may be adopted.

Moreover, in each invention described above, the computer is preferably configured to fit a known peak shape data of the unique peak of the reference sample to the calculated spectrum of the reference sample instead of performing the interpolation, and use a wavenumber of a peak top after fitting as the read-out value of the wavenumber.

Moreover, in the Fourier transform infrared spectrometer according to the present invention, it is preferred that, when there is no input related to operation of the Fourier transform infrared spectrometer for more than a certain period of time while the Fourier transform infrared spectrometer is not executing measurement, the computer is configured to:

execute the program automatically to correct the wavenumber;
measure a background with a measurement parameter for a usual sample; and
execute a standby state for an input related to a next measurement.

In this configuration, when the computer determines a condition that the Fourier transform infrared spectrometer is in a non-operation state (when a state without input related to the operation of the Fourier transform infrared spectrometer has continued for more than a certain period of time), the wavenumber correction program is automatically executed, and a background measurement with the wavenumber after correction is automatically executed subsequently. Moreover, when these processing is completed, the computer goes into a standby state for the next measurement automatically. Accordingly, even if the user is unaware of executing wavenumber correction, the next measurement can be started smoothly since the wavenumber is corrected constantly.

Moreover, in the Fourier transform infrared spectrometer according to the present invention, it is preferred that,
when there is an input related to execution of the program or
when it is the pre-reserved time to run the program if the time has set
while the Fourier transform infrared spectrometer is not executing measurement,
the computer is configured to:
execute the program to correct the wavenumber;
measure a background with a measurement parameter for a usual sample; and
execute a standby state for an input related to a next measurement.

In this configuration, since wavenumber correction is carried out only at a timing assumed by the user, wavenumber correction is not executed by the Fourier transform infrared spectrometer without the user recognition. For example, in applications in which the FTIR performs measurement continuously for 24 hours a day, 365 days a year, wavenumber correction can be performed at a predetermined time such as "at ~o'clock in midnight, every Monday".

Advantageous Effects of Invention

All FTIRs of each configuration have same common functions those they measure the spectrum of the solid reference sample, read out the unique absorption peak of the reference sample, compare with the original wavenumber of the reference sample, and correct the wavenumber of the spectrum.

First, in the FTIR in a nitrogen-purged or vacuumed state, a greater detection intensity can be acquired when an absorption peak of a solid reference sample is used rather than an absorption peak of the atmosphere (carbon dioxide or water vapor), and a read-out value of the wavenumber of the measurement spectrum can be compared with the original wavenumber easily.

Moreover, with a solid reference sample, it is easy to determine the measurement time and secure the accuracy of the wavenumber correction since the S/N ratio of the reference sample is more stable rather than the atmosphere (carbon dioxide or water vapor) the vary the peak height depending on the measurement environment.

In addition, even if the full width of the half maximum is wider than the accuracy of the desired correction, it can be read the unique peak wavenumber more accurate to add the interpolation data from the unique peak of the reference sample to the calculated spectrum by the FTIRs, results the reliability of the accuracy of the spectrum.

According to the configuration of the present invention, wavenumber correction of a measurement spectrum can be performed smoothly and precisely by using a solid reference sample.

Moreover, it is also effective that it is easier to use the semiconductor laser in stable by adjusting the temperature or the applied current to be constant.

DESCRIPTION OF EMBODIMENTS

Figure 1:
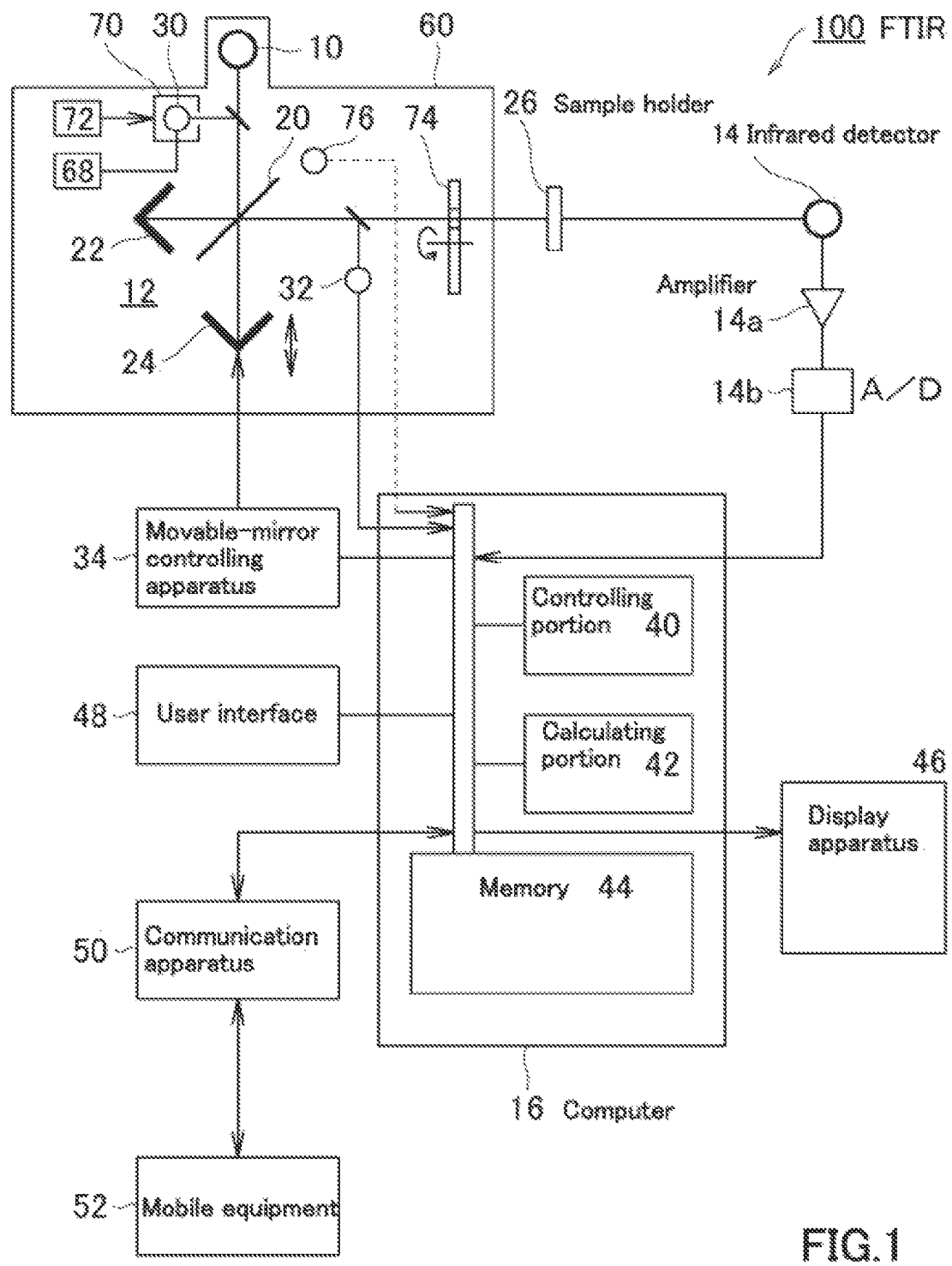
FIG. 1 illustrates a schematic configuration of a FTIR according to one embodiment.

Preferred embodiments of the present invention are described with reference to the drawings in the following. The present invention can be applied to a Fourier transform infrared spectrometer (FTIR) and an infrared microscopic apparatus. Here, a case when it is applied to a FTIR 100 as exemplified in FIG. 1 in particular. The FTIR 100 comprises: an infrared light source 10; an interferometer 12 that forms an infrared interference wave; a sample holder 26 that holds a sample; an infrared detector 14 that detects an intensity of an interference wave acquired by irradiating the infrared interference wave to the sample; and a computer 16 that calculates a spectral information of the sample based on a detected signal from the infrared detector 14. The computer 16 is configured of a microcomputer installed in the main body of the FTIR 100, or a personal computer separate from the main body.

The infrared light source 10 and the interferometer 12 are housed in a housing 60. A light-flux splitter (beam splitter 20) that separates the infrared light, and a fixed mirror 22 and a movable mirror 24 that respectively reflect a separated light are disposed as the interferometer 12, and two light fluxes of different optical path lengths are synthesized to generate the infrared interference wave. The movable mirror 24 is provided to be movable in both directions of getting closer to and going away from the beam splitter 20.

The infrared interference wave that exits from an exit window is irradiated to the sample inside the sample holder 26 provided between the exit window and the infrared detector 14. The infrared detector 14 receives the infrared interference wave from the sample, and outputs a detected signal thereof. The detected signal from the infrared detector 14 passes through an amplifier 14a and an A/D convertor 14b, and is input to the computer 16.

In the housing 60, a semiconductor laser 30 for position reference for acquiring position information of the movable mirror 24 by a laser light, and a laser detector 32 that detects a laser interference wave are disposed. In the present embodiment, the interferometer 12 also functions as a laser interferometer, and the laser light (monochromatic light) from the semiconductor laser 30 is guided to a same optical path as the infrared light to enter the beam splitter 20. The interferometer 12 also generates a laser interference wave in accordance with the movement of the movable mirror 24, and the laser detector 32 detects the laser interference wave from the beam splitter 20 to output an intensity signal thereof to the computer 16. A separate and dedicated laser rangefinder may be provided to the same housing as the interferometer 12, and another rangefinder for measuring the position of the movable mirror 24 by using a laser optical path which does not pass through the beam splitter 20 may be formed, for example.

In the present embodiment, a vertical cavity surface emitting laser (VCSEL) which is more compact and lasts longer than an ordinary semiconductor laser is disposed in the housing 60 as the semiconductor laser 30, so that the FTIR 100 may be miniaturized and last longer. The semiconductor laser 30 comprises an applied-current controller 68 for controlling an applied current to the semiconductor laser 30. Moreover, the semiconductor laser 30 comprises a Peltier element 70 for temperature control and a temperature controller 72 that controls the Peltier element.

Figure 2:
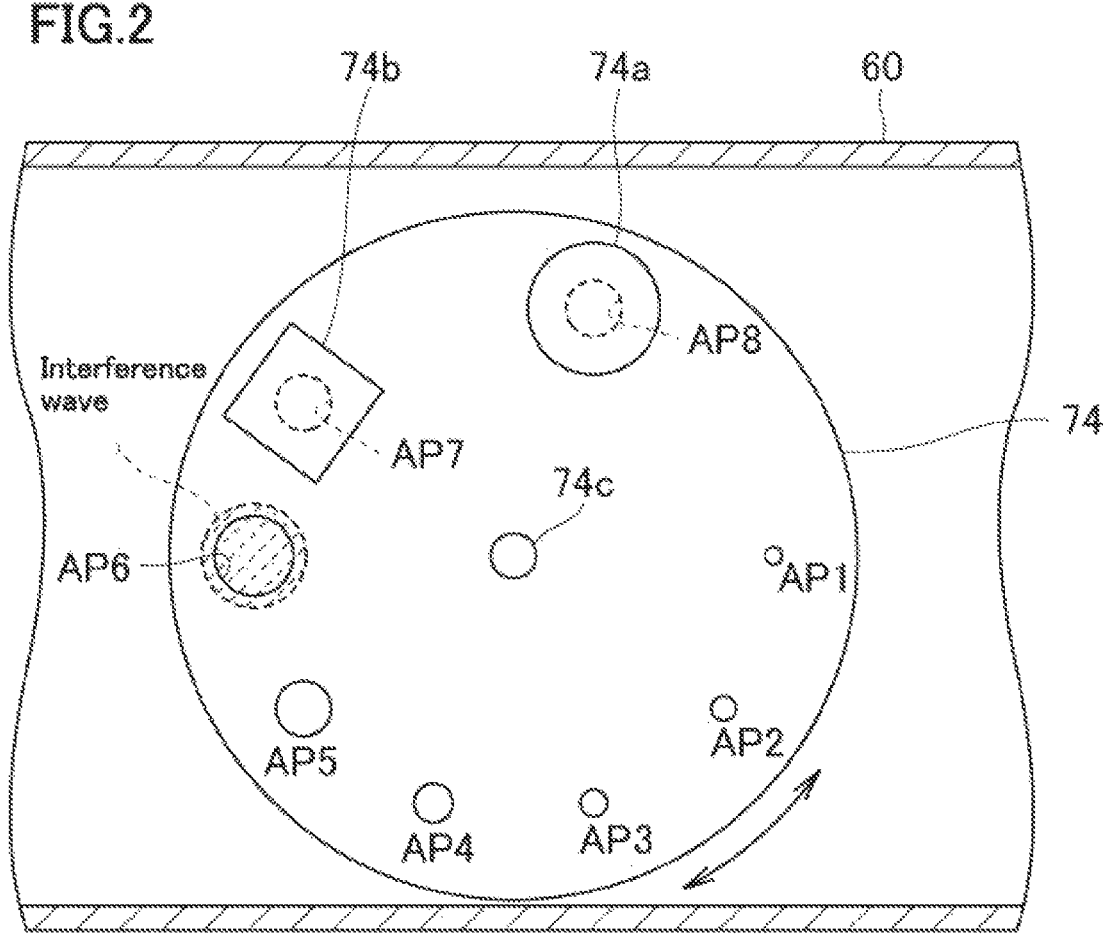
FIG. 2 illustrates an aperture validation wheel of the FTIR.

In addition, in the housing 60, a revolver type switching apparatus (aperture validation wheel) 74 that automatically switches an aperture and the reference sample is disposed in front of the exit window. FIG. 2 illustrates a disk-shaped switching apparatus 74 having a hole 74c for a drive shaft of a motor at its center. On the disk of the switching apparatus 74, a plurality of apertures AP1 to AP8 are formed along a circumference. The apertures AP1 to AP6 are in different sizes, and can be automatically switched to aperture sizes corresponding to a set wavenumber resolution. FIG. 2 illustrates a state which the aperture AP6 is exactly located on an optical path of the interference wave from the beam splitter 20. Moreover, the apertures AP7, AP8 are for the reference sample, and the reference sample 74a (e.g., polystyrene film) is fixed such that it covers the aperture AP8 in the present embodiment. The aperture AP7 may be mounted with other reference sample 74b such as a glass. The sizes of the apertures AP7, AP8 are sizes in accordance with wavenumber resolution assumed to be set upon measurement of the reference samples 74a, 74b, and they are the same size as the aperture AP5 here. By positioning the part of the disk without the apertures to the position on the optical axis of the interference wave, the switching apparatus 74 functions as a shielding plate.

By using such switching apparatus 74, the daily wavenumber correction routine becomes easier since the process of setting the reference sample at the measurement position in FTIR100 each time can be omitted. The computer 16 performs a series of operations for wavenumber correction by the wavenumber correction program automatically. In addition, the temperature of the reference sample 74a is stabilized since the reference sample 74a is positioned far enough from the infrared light source 10, which is the biggest heat source of the FTIR 100 to be nearly in a thermal equilibrium constantly by being disposed in an airtight. Therefore, a wavenumber shift derived from temperature variation of the reference sample 74a does not occur, and wavenumber correction can be executed as usual.

Moreover, a thermo-hygro sensor 76 is disposed in the housing 60. This thermo-hygro sensor 76 constantly detects the temperature and humidity inside the housing 60, so that the temperature and humidity can monitored by a display apparatus 46 of the FTIR 100.

When a thermal distortion of the interferometer 12 occurs, a wavenumber drift may occur. Therefore, the computer 16 may read out the temperature variation from thermos hygro sensor 76 and correct the wavenumber drift caused by the thermal drift.

Next, the computer 16 comprises: a controlling portion 40 that controls each constituent of the computer 16; a calculating portion 42 that executes calculation of a spectral information of the sample based on the detected signal from the infrared detector 14 and spectral analysis thereof; and a memory 44 that retains a data processing program executed by the calculating portion 42, the calculated spectral information, an analysis result, and a background information. Moreover, a display apparatus 46 and a user interface 48 are connected to the computer 16.

Furthermore, a movable-mirror controlling apparatus (movable-mirror controller) 34 is connected to the computer 16. The calculating portion 42 counts an intensity variation of the laser interference wave in accordance with the movement of the movable mirror 24 based on the intensity signal of the laser interference wave from the laser detector 32 to calculate the position information of the movable mirror 24. The movable-mirror controlling apparatus 34 receives the position information of the movable mirror 24 and information of a target position to execute speed control, in particular constant speed control, of the movable mirror 24.

While the movable-mirror controlling unit 34 moves the movable mirror 24 for one stroke, the calculating portion 42 receives the intensity signal of the infrared interference wave for one scan, and calculates an interferogram (interference curve) based on the intensity signal of the infrared interference wave and the position information of the movable mirror 24.

For example, the calculating portion 42 integrates the interferograms of a plurality of scans, and performs Fourier transformation to the same to calculate a single beam spectrum (SB spectrum); however, it may be calculated by other procedures such as integrating the SB spectrum after Fourier transformation, not the interferogram, for example. Furthermore, the SB spectrum may be divided by the background information to calculate a transmission spectrum.

A communication apparatus 50 may be connected to the computer 16 as necessary. The communication apparatus 50 is a wireless communication equipment using Wi-Fi standard or Bluetooth standard, for example. It can communicate with a remote mobile equipment 52, and displays the same information as the information displayed on the display apparatus 46 on the monitor of the mobile equipment 52. Moreover, the mobile equipment 52 may be a mobile terminal such as a smart phone, and the mobile terminal may encrypt a measurement spectral data into an E-mail, and send it to an external server computer, not shown. The measurement spectral data is spectrally analyzed in the server computer, and an analysis result thereof is sent to the mobile equipment to be displayed on the monitor thereof. By providing the communication apparatus 50 and configuring the remote server computer to perform spectral analysis, a personal computer for spectral analysis does not need to be carried around with the FTIR 100, and portability thereof improves. It becomes sufficient to install minimum necessary functions to the computer 16 of the FTIR 100, so that the computer 16 can be configured only with a microcomputer installed to the main body, and the FTIR 100 can be miniaturized.

<Wavenumber Correction Program>

A spectral wavenumber correction program is a program for correcting a measurement wavenumber of the FTIR based on a spectral data of a reference sample.

Figure 3:
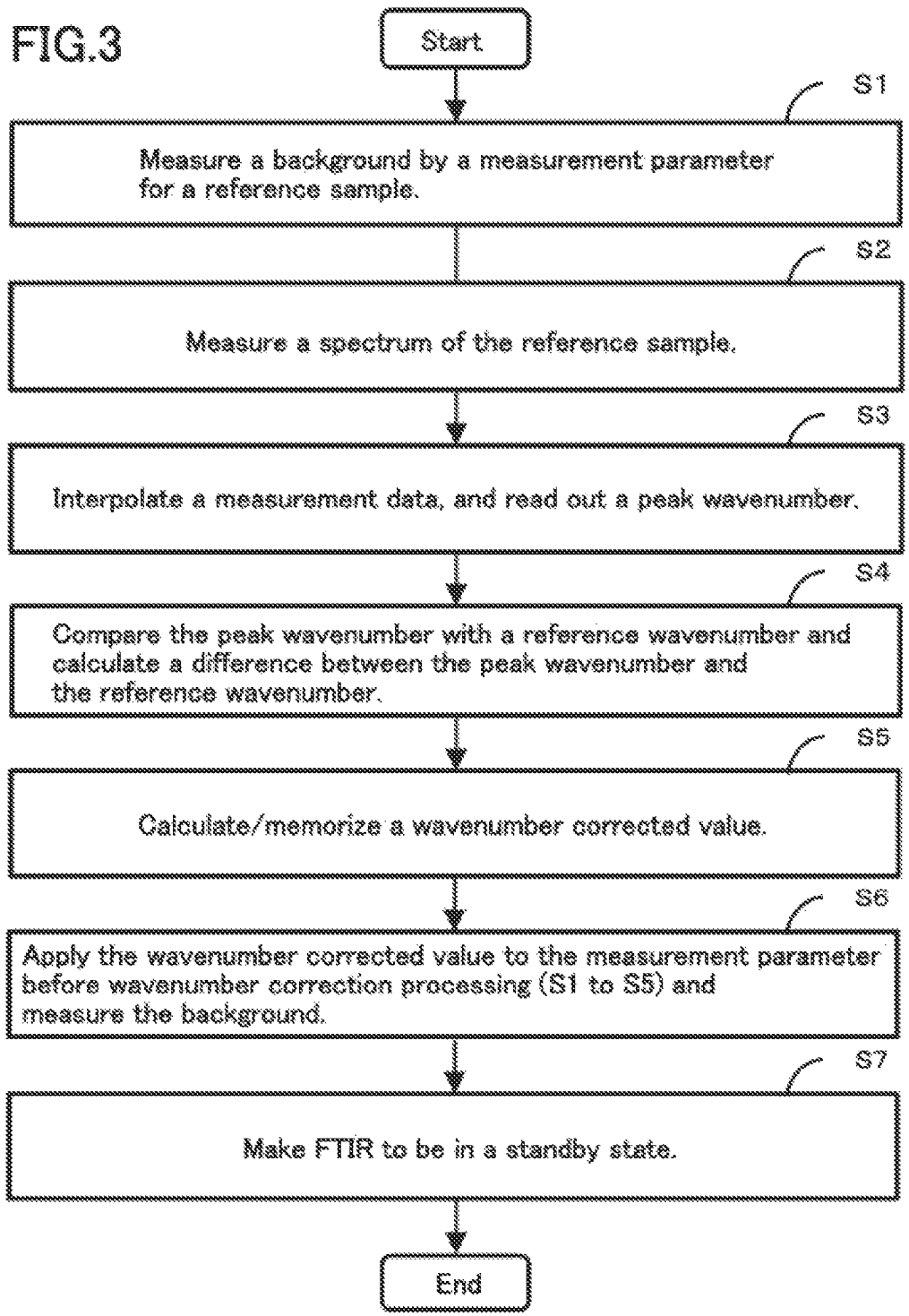
FIG. 3 illustrates a flow diagram of wavenumber correction of the FTIR.

The wavenumber correction program makes the computer 16 to execute the following processing flows S1 to S5. As shown in FIG. 3, after the processing of wavenumber correction of the present embodiment, the processing flows S6 and S7 may be executed subsequently as necessary The FTIR 100 drives the switching apparatus 74 in advance, selects the aperture AP5 which has a same size aperture of AP8 for the reference sample 74a, and executes a background measurement (processing flow S1). This background information is also used in calculation of the spectrum of the reference sample 74a measured for wavenumber correction.

The processing flow S2 (spectral measurement of the reference sample) of FIG. 3 is described. First, the computer 16 drives the switching apparatus 74, selects the reference sample 74a, and measures its spectral data. Wavenumber resolution (spectral data point of the wavenumber axis) of the FTIR 100 is set in accordance with the type of the reference sample 74a and the shape of a unique peak (reference wavenumber) of the reference sample 74a. When this wavenumber resolution is set too high, it becomes difficult to discriminate the peak top of the reference sample, since the selected aperture size get smaller and the amount of light (signal S) becomes decreased may result S/N worse. Therefore, the wavenumber resolution may be set such as the calculated spectral interval is 1-3 digits coarser comparing to the required correction accuracy.

Next, the processing flow S3 (interpolation of measurement data) is described. The computer 16 automatically interpolates the acquired measurement data to a high-density data. Here, a smoothing processing using a cubic spline is performed, but it is not limited thereto. In the present embodiment, the amount of calculation of the computer 16 is greatly reduced by executing the following two points: applying an interpolation processing to the spectral data after Fourier transformation; and cutting out only a data of a wavenumber region necessary for peak formation and applying an interpolation processing to the data of the wavenumber region.

Figure 4:
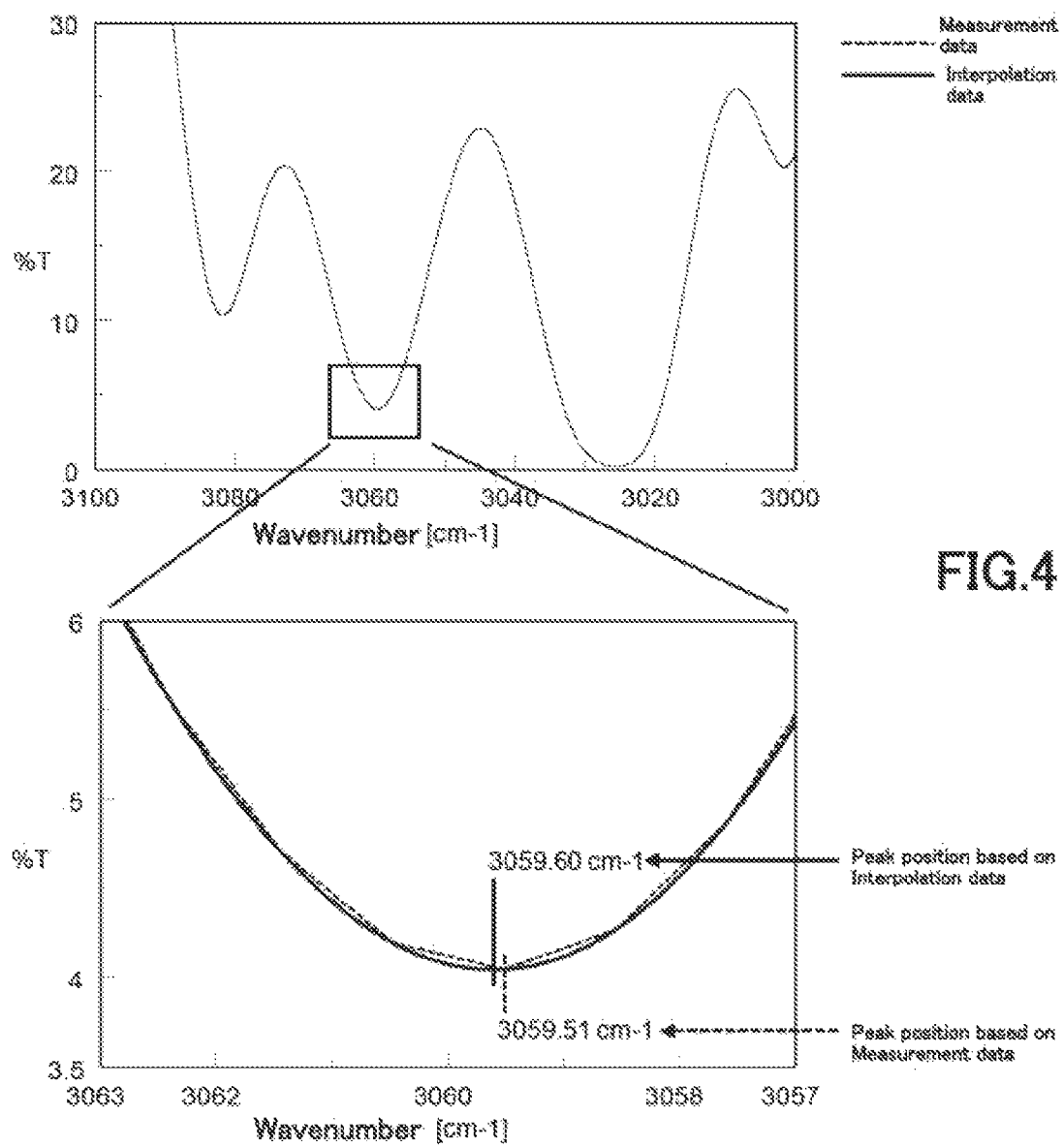
FIG. 4 illustrates an explanation diagram of an interpolation method of a measurement data in the wavenumber correction flow.

Then, the position (wavenumber) of the peak is read out from a minimum value (when the vertical axis is a transmittance % T) or a maximum value (when the vertical axis is an absorption Abs) in the wavenumber region. FIG. 4 illustrates a measurement wavenumber of a peak when the vertical axis is the transmittance % T. The measurement wavenumber of the peak of the measurement data is "3059.51 cm$^{-1}$", for example, but the interpolation data shows a more precise measurement wavenumber of the peak upon measurement. Here, the measurement wavenumber of the peak based on the interpolation data is "3059.60 cm$^{-1}$", for example.

Next, the processing flow S4 (calculation of a difference of wavenumber between the measurement and the reference) is described. For example, the computer 16 stores "3059.7 cm$^{-1}$" as the reference wavenumber of the unique peak of the reference sample 74a. In this example, the difference of wavenumber becomes "−0.1 cm$^{-1}$" of which the reference wavenumber is subtracted from the measurement wavenumber of the peak based on the interpolation data.

Next, the processing flow S5 (calculation/memorization of a wavenumber corrected value) is described. The data interval of the wavenumber after Fourier transformation of the FTIR is proportional to "1/λ: λ is the wavelength of the semiconductor laser". In the present embodiment, this relationship is used to correct the wavenumber (maximum value of wavenumber) assumed by calculation upon Fourier transformation based on the difference of wavenumber. For example, the FTIR 100 acquires the interferogram at the wavenumber interval (≈850 nm) of the reference laser, and performs Fourier transformation FFT of the interferogram to expand the data at equal intervals in a wavenumber space of 11765 cm$^{-1}$ (≈1/850 nm).

To make explanation easier, 850 nm set as is a design value of a laser wavelength. The difference of wavenumber (−0.1 cm$^{-1}$) calculated at the processing flow S4 is a value when the wavenumber axis of the peak is 3059.7 cm$^{-1}$. The computer 16 calculates the laser wavelength such that the output value of Fourier transformation becomes "3059.7 cm$^{-1}$" based on the output value after Fourier transformation is "3059.6 cm$^{-1}$" at 850 nm of laser wavelength.

In other words, the computer 16 calculates the spectral data at equal intervals in the wavenumber range of (1/850 nm$^{-1}$) cm$^{-1}$ to 0 cm$^{-1}$, supposing that the laser wavelength is 850 nm. The wavenumber axis "3059.6 cm$^{-1}$" of the peak on this calculation is desired to be corrected as "3059.7 cm$^{-1}$". That is, when a coefficient A is defined as "A=3059.7÷3059.6", the wavenumber range after correction becomes:

(A/850 nm) cm$^{-1}$~0 cm$^{-1}$.

Accordingly, the computer 16 can calculate the laser wavelength used in calculation of Fourier transformation as 850÷A≈849.97 nm.

The laser wavelengths after correction may be calculated similarly from multiple unique peaks of the reference sample 74a, and an average value of the calculated values (e.g., "850 nm÷A") from all peaks may be regarded as the laser wavelength after correction. Or, the average value of a weighted values at each peak may be regarded as the wavelength after correction.

The computer 16 can calculate the corrected wavenumber by Fourier transformation with this corrected wavelength of the laser (also called a wavenumber corrected value). Moreover, the computer 16 can update the wavelength in the memory 44, that is, the corrected wavelength of the laser is stored at the memory 44 of the FTIR and can be used for the following Fourier transformation.

In the above explanation, the reference wavenumber of the unique peak of the reference sample 74a stored in the memory 44 is set as "3059.7 cm$^{-1}$"; however, this reference wavenumber may be stored as a specific range such as "3059.68 cm$^{-1}$ to 3059.72 cm$^{-1}$".

For example, when the wavenumber correction is executed with the plural peaks of the reference sample 74a, the corrected wavelength of the laser may be calculated by the decision criteria that all the corrected reference peaks of the reference sample 74a are in the specific range (e.g. 3059.68 cm$^{-1}$ to 3059.72 cm$^{-1}$), instead of the average of the corrected laser wavelength. Accordingly, the wavenumber correction can be improved by the calculation of the plural peaks rather than the single peak since the information of the correction may be increased.

Moreover, an operating system may be constructed that the results of the wavenumber corrections are automatically sent to a server computer via a network and are saved in the server computer as a middle-long term maintenance information.

The communication method to the server computer far from the FTIR 100 is not limited by an e-mail with the mobile terminal (mobile equipment 52) such as a smart phone.

For example, the mobile terminal receives the result of wavenumber correction from the FTIR 100, and may automatically update the data in a storage of the server computer directly if it has an access privilege to the server computer. The user may manually manipulate the files. The server computer manages the received files of the result of wavenumber correction for each uploaded terminal, and can provide the files to the user in accordance with a request from the mobile terminal via a network any time.

As a method other than file sharing, for example, a technique of sharing information using writing to a database file in a cloud or a server computer can be adopted. In this case, the mobile terminal and the server computer access to the database file in the cloud or the server computer respectively, and manages information on one file. In this case, the mobile terminal may acquire and use a user interface for browsing the contents in the database file as a dedicated program or a browser application.

When measuring a solid reference sample 74a in a specific wavenumber range with a high wavenumber resolution (dense wavenumber interval) may be adopted, however a measurement time may be long to acquire a good S/N spectrum by the high wavenumber resolution (with a small aperture size, and/or a longer scanning distance) with increased accumulation times, since usually S/N ratio tends to be worse with the high wavenumber resolution parameter. In order to execute wavenumber correction of a measurement spectrum smoothly and precisely with the solid reference sample 74a, it is preferred that a measurement parameter of a relatively low wavenumber resolution (rough wavenumber interval) (with a big aperture size and/or a shorter scanning distance) is adopted to acquire data with a good S/N ratio in a relatively short time, and an interpolation method to a wavenumber range of the unique peak in the processing flow S3 is applied subsequently. According this process, the unique peak wavenumber of the solid reference sample 74a can be acquired in a short time with good precision (reproducibility), and, as a result, wavenumber correction of the measurement spectrum can be accelerated and a further improvement in precision can be achieved.

In the processing flow S2, measuring the solid reference sample 74a with a relatively low wavenumber resolution means that, when a base line is drawn to the unique peak to set a full width of half maximum, the point of the spectral data in the wavenumber range of the full width of half maximum is about "10 to 100 points", preferably "15 to 50 points".

If the measurement time of the interferogram data are the same, reproducibility of the peak position (read-out value of the wavenumber) is superior when the peak wavenumber is acquired by performing interpolation to the spectral data (high S/N) acquired with a low wavenumber resolution parameter than when the peak wavenumber is acquired by performing least squares approximation to the spectral data (low S/N) acquired with a high wavenumber resolution parameter.

In the present embodiment, the interpolation data is imparted when the unique peak of the reference sample 74a is read out; however, a peak top (measurement wavenumber) may be read out by a method of fitting a known peak shape data of the unique peak of the reference sample 74a to the calculated spectrum of the reference sample 74a instead.

A modification of the wavenumber correction program is described. In the processing flow S3 of the program, after the computer 16 calculates the peak position "3059.6 cm$^{-1}$" based on the interpolation data, the applied-current controller 68 of FIG. 1 may control the applied current to the semiconductor laser 30 such that the peak position "3059.6 cm$^{-1}$" based on the interpolation data falls within an acceptable range (e.g., 3059.7±1.5 cm$^{-1}$) having the reference wavenumber "3059.7 cm$^{-1}$" of the reference sample 74a at the center. In this case, correlation between the applied current and the measurement wavenumber of the spectrum or a laser oscillation wavelength may be acquired in advance.

Furthermore, another modification of the wavenumber correction program is described. In the processing flow S3, after the computer 16 calculates the peak position "3059.6 cm$^{-1}$" based on the interpolation data, the temperature controller 72 of FIG. 1 may control the Peltier element 70 such that the peak position "3059.6 cm$^{-1}$" based on the interpolation data falls within an acceptable range having the reference wavenumber "3059.7 cm$^{-1}$" of the reference sample 74a at the center. In this case, correlation between the laser temperature and the measurement wavenumber of the spectrum or a laser oscillation wavelength may be acquired in advance.

Here, the computer 16 is configured to have at least one or more of the following execution patterns of wavenumber correction programs.

When the user manually executes the wavenumber correction program for daily inspection of the FTIR 100, the computer 16 executes the wavenumber correction program according to an input related to an execution of the program.

The computer 16 is configured such that the user can set an execution schedule of the wavenumber correction program, and automatically executes the wavenumber correction program when it is the pre-reserved time/date.

When aging after power-on is completed and the FTIR 100 is stabilized, or when the computer 16 starts the measurement program (e.g., a measurement menu is displayed on the monitor), the computer 16 automatically executes the wavenumber correction program.

When there is no input related to operation of the FTIR 100, such as operation by the user, for more than a certain period of time, the computer 16 determines that "the FTIR 100 is in no operation state", and automatically executes the wavenumber correction program.

In any of the above-described patterns, after wavenumber correction is completed by executing the wavenumber correction program, the background measurement is automatically executed by using a parameter set just before wavenumber correction (e.g., parameter showing various measurement conditions for a usual sample such as selection of the aperture, and stroke length of the movable mirror), and then the stand-by state of an input related to the next measurement may be executed (see processing flows S6, S7 of FIG. 3 to be described later).

In particular, when the computer 16 determines a start-up state of the FTIR 100 to execute wavenumber correction, the user does not have to remeasure the background in the next measurement if the background measurement is automatically executed by the computer 16 subsequently to the series of operations for wavenumber correction; therefore, convenience for the user is enhanced.

According to the configurations of the FTIR 100 of the present embodiment as described above, a greater detection intensity can be acquired by using the solid reference sample 74a such as a polystyrene film than using the atmosphere (carbon dioxide or water vapor) of which signal is easily affected in nitrogen purging or vacuum state at the FTIR 100 as the reference sample, and the read-out value of the measurement spectrum and the original wavenumber can be compared easily. Moreover, the measurement time tends to be constant with the solid reference sample 74a than a spectrum of the atmosphere (carbon dioxide or water vapor) such that S/N ratio varies every time when the peak height varies depending on the measurement environment, and precision of wavenumber correction of the measurement spectrum can be secured easily.

In addition, by imparting the interpolation data to the wavenumber range of the unique peak of the reference sample 74a to the spectrum calculated at the FTIR 100, the wavenumber of the peak can be read out precisely even if the unique peak of the solid reference sample 74a has an extremely larger full width of half maximum than wavenumber precision to be acquired by correction; therefore, reliability of wavenumber correction of the measurement spectrum improves According to the configuration of the FTIR 100 of the present embodiment, precision (reproducibility) of the wavenumber of the measurement spectrum equivalent to that of when a He—Ne laser is used can be achieved by executing the wavenumber correction function of the FTIR 100 even if an unique oscillation wavenumber of the semiconductor laser 30 is unstable.

Moreover, since the FTIR 100 can be miniaturized easily, a need for portability of the FTIR is increased. That is, a need for reliability confirmation (daily inspection) or calibration to the apparatus is increasing compared to the conventional FTIR which is assumed to be used stably in a stationary state. By adopting the present embodiment, wavenumber precision/reproducibility or reliability on wavenumber correctness can be improved in particular.

REFERENCE SIGNS LIST

10 Infrared light source
12 Interferometer
14 Infrared detector
16 Computer
20 Beam splitter (light-flux separator)
22 Fixed mirror
24 Movable mirror
30 Semiconductor laser
32 Laser detector
34 Movable-mirror controlling apparatus
44 Memory
46 Display apparatus
48 User interface
50 Communication apparatus
52 Mobile equipment
60 Housing
68 Applied-current controller
70 Peltier element
72 Temperature controller
74 Switching apparatus
74a Reference sample
76 Thermo-hygro sensor
100 Fourier transform infrared spectrometer (FTIR)

The invention claimed is:

1. A Fourier transform infrared spectrometer comprising:
an infrared light source;
an interferometer that has a beam splitter, a fixed mirror and a movable mirror, and generates an infrared interference wave by using an infrared light from the infrared light source;
an infrared detector that detects an intensity of the infrared interference wave that transmitted or reflected off a sample;
a revolver type switching apparatus including a plurality of apertures;
a semiconductor laser that irradiates a laser light to the interferometer;
a laser detector that detects an intensity of a laser interference wave that is generated at the interferometer based on the laser light;
a memory that memorizes a wavelength of the semiconductor laser; and
a computer that uses the wavelength in the memory and a detected signal of the laser detector and performs Fourier transformation to a detected signal of the infrared detector to calculate a spectrum of the sample;
wherein
the computer executes a program for calculating a spectrum of a solid reference sample, interpolating the calculated spectrum of the reference sample in a wavenumber range of at least one unique peak of the reference sample, reading out a wavenumber of the at least one unique peak based on a data after interpolation, and updating the wavelength in the memory such that the read-out value of the wavenumber falls within a tolerance range having a wavenumber of the unique peak as a center, and
wherein the solid reference sample is provided in at least one of the plurality of apertures.

2. The Fourier transform infrared spectrometer of claim 1, wherein, when there is no input related to operation of the Fourier transform infrared spectrometer for more than a certain period of time while the Fourier transform infrared spectrometer is not executing measurement, the computer is configured to:
execute the program automatically to correct the wavenumber;
measure a background with a measurement parameter for a usual sample; and
execute a standby state for an input related to a next measurement.

3. The Fourier transform infrared spectrometer of claim 1, wherein, when there is an input related to an execution of the program or when it is the pre-reserved time to run the program if the time has set while the Fourier transform infrared spectrometer is not executing measurement, the computer is configured to:
execute the program to correct the wavenumber;
measure a background with a measurement parameter for a usual sample; and
execute a standby state for an input related to a next measurement.

4. The Fourier transform infrared spectrometer of claim 1, wherein the solid reference sample is a polystyrene film.

5. The Fourier transform infrared spectrometer of claim 1, wherein a plurality of the apertures are different sizes, and can be automatically switched to aperture sizes corresponding to a set wavenumber resolution.

6. A Fourier transform infrared spectrometer comprising:
an infrared light source;
an interferometer that has a beam splitter, a fixed mirror and a movable mirror, and generates an infrared interference wave by using an infrared light from the infrared light source;
an infrared detector that detects an intensity of the infrared interference wave that transmitted or reflected off a sample;
a revolver type switching apparatus including a plurality of apertures;
a semiconductor laser that irradiates a laser light to the interferometer;
a laser detector that detects an intensity of a laser interference wave that is generated at the interferometer based on the laser light;
a memory that memorizes a wavelength of the semiconductor laser; and
a computer that uses the wavelength in the memory and a detected signal of the laser detector and performs Fourier transformation to a detected signal of the infrared detector to calculate a spectrum of the sample;
wherein the computer executes a program for calculating a spectrum of a solid reference sample, fitting a known peak shape data of one unique peak of the reference sample to the calculated spectrum of the reference sample, reading out a wavenumber of a peak top after fitting, and updating the wavelength in the memory such that the read-out value of the wavenumber falls within a tolerance range having a wavenumber of the unique peak as a center, and
wherein the solid reference sample is provided in at least one of the plurality of apertures.

7. A Fourier transform infrared spectrometer comprising:
an infrared light source;
an interferometer that has a beam splitter, a fixed mirror and a movable mirror, and generates an infrared interference wave by using an infrared light from the infrared light source;
an infrared detector that detects an intensity of the infrared interference wave that transmitted or reflected off a sample;
a revolver type switching apparatus including a plurality of apertures;
a semiconductor laser that irradiates a laser light to the interferometer;
a laser detector that detects an intensity of a laser interference wave that is generated at the interferometer based on the laser light;
a memory that memorizes a wavelength of the semiconductor laser; and
a computer that uses the wavelength in the memory and a detected signal of the laser detector and performs Fourier transformation to a detected signal of the infrared detector to calculate a spectrum of the sample;
a Peltier element that controls temperature of the semiconductor laser; and
a temperature controller of the Peltier element;
wherein
the computer executes a program for calculating a spectrum of a solid reference sample, interpolating the calculated spectrum of the reference sample in a wavenumber range of at least one unique peak of the reference sample, reading out a wavenumber of the at least one unique peak based on a data after interpolation, and controlling a temperature of the semiconductor laser by operating the temperature controller of the Peltier element such that the read-out value of the wavenumber falls within a tolerance range having a wavenumber of the unique peak as a center, and
wherein the solid reference sample is provided in at least one of the plurality of apertures.

8. The Fourier transform infrared spectrometer of claim 7, wherein, when there is no input related to operation of the Fourier transform infrared spectrometer for more than a certain period of time while the Fourier transform infrared spectrometer is not executing measurement, the computer is configured to:
execute the program automatically to correct the wavenumber;
measure a background with a measurement parameter for a usual sample; and
execute a standby state for an input related to a next measurement.

9. The Fourier transform infrared spectrometer of claim 7, wherein, when there is an input related to an execution of the program or when it is the pre-reserved time to run the program if the time has set while the Fourier transform infrared spectrometer is not executing measurement, the computer is configured to:
execute the program to correct the wavenumber;
measure a background with a measurement parameter for a usual sample; and
execute a standby state for an input related to a next measurement.

10. A Fourier transform infrared spectrometer comprising:
an infrared light source;
an interferometer that has a beam splitter, a fixed mirror and a movable mirror, and generates an infrared interference wave by using an infrared light from the infrared light source;
an infrared detector that detects an intensity of the infrared interference wave that transmitted or reflected off a sample;
a revolver type switching apparatus including a plurality of apertures;
a semiconductor laser that irradiates a laser light to the interferometer;
a laser detector that detects an intensity of a laser interference wave that is generated at the interferometer based on the laser light;
a memory that memorizes a wavelength of the semiconductor laser;
a computer that uses the wavelength in the memory and a detected signal of the laser detector and performs Fourier transformation to a detected signal of the infrared detector to calculate a spectrum of the sample;
a Peltier element that controls temperature of the semiconductor laser; and
a temperature controller of the Peltier element;
wherein the computer executes a program for calculating a spectrum of a solid reference sample, fitting a known peak shape data of one unique peak of the reference sample to the calculated spectrum of the reference sample, reading out a wavenumber of a peak top after fitting, and controlling a temperature of the semiconductor laser by operating the temperature controller of the Peltier element such that the read-out value of the wavenumber falls within a tolerance range having a wavenumber of the unique peak as a center, and wherein the solid reference sample is provided in at least one of the plurality of apertures.

11. A Fourier transform infrared spectrometer comprising:
an infrared light source;
an interferometer that has a beam splitter, a fixed mirror and a movable mirror, and generates an infrared interference wave by using an infrared light from the infrared light source;
an infrared detector that detects an intensity of the infrared interference wave that transmitted or reflected off a sample;
a revolver type switching apparatus including a plurality of apertures;
a semiconductor laser that irradiates a laser light to the interferometer;
a laser detector that detects an intensity of a laser interference wave that is generated at the interferometer based on the laser light;
a memory that memorizes a wavelength of the semiconductor laser;
a computer that uses the wavelength in the memory and a detected signal of the laser detector, and performs Fourier transformation to a detected signal of the infrared detector to calculate a spectrum of the sample; and
an applied-current controller that controls an applied current to the semiconductor laser,
wherein
the computer executes a program for calculating a spectrum of a solid reference sample, interpolating the calculated spectrum of the reference sample in a wavenumber range of at least one unique peak of the reference sample, reading out a wavenumber of the at least one unique peak based on a data after interpolation, and controlling the applied current to the semiconductor laser by operating the applied-current controller such that the read-out value of the wavenumber falls within a tolerance range having a wavenumber of the unique peak as a center, and
wherein the solid reference sample is provided in at least one of the plurality of apertures.

12. The Fourier transform infrared spectrometer of claim 11,
wherein, when there is no input related to operation of the Fourier transform infrared spectrometer for more than a certain period of time while the Fourier transform infrared spectrometer is not executing measurement, the computer is configured to:
execute the program automatically to correct the wavenumber;
measure a background with a measurement parameter for a usual sample; and
execute a standby state for an input related to a next measurement.

13. The Fourier transform infrared spectrometer of claim 11,
wherein, when there is an input related to an execution of the program or when it is the pre-reserved time to run the program if the time has set while the Fourier transform infrared spectrometer is not executing measurement, the computer is configured to:
execute the program to correct the wavenumber;
measure a background with a measurement parameter for a usual sample; and
execute a standby state for an input related to a next measurement.

14. A Fourier transform infrared spectrometer comprising:
an infrared light source;
an interferometer that has a beam splitter, a fixed mirror and a movable mirror, and generates an infrared interference wave by using an infrared light from the infrared light source;
an infrared detector that detects an intensity of the infrared interference wave that transmitted or reflected off a sample;
a revolver type switching apparatus including a plurality of apertures;
a semiconductor laser that irradiates a laser light to the interferometer;
a laser detector that detects an intensity of a laser interference wave that is generated at the interferometer based on the laser light;
a memory that memorizes a wavelength of the semiconductor laser;
a computer that uses the wavelength in the memory and a detected signal of the laser detector, and performs Fourier transformation to a detected signal of the infrared detector to calculate a spectrum of the sample; and
an applied-current controller that controls an applied current to the semiconductor laser,
wherein the computer executes a program for calculating a spectrum of a solid reference sample, fitting a known peak shape data of one unique peak of the reference sample to the calculated spectrum of the reference sample, reading out a wavenumber of a peak top after fitting, and controlling the applied current to the semiconductor laser by operating the applied-current controller such that the read-out value of the wavenumber falls within a tolerance range having a wavenumber of the unique peak as a center, and
wherein the solid reference sample is provided in at least one of the plurality of apertures.

* * * * *